(12) United States Patent
Yang et al.

(10) Patent No.: US 10,541,736 B2
(45) Date of Patent: Jan. 21, 2020

(54) CODEBOOK-BASED UPLINK TRANSMISSION IN WIRELESS COMMUNICATIONS

(71) Applicant: MediaTek Inc., Hsinchu (TW)

(72) Inventors: Weidong Yang, San Diego, CA (US);
Chao-Cheng Su, Hsinchu (TW);
Tzu-Han Chou, Hsinchu (TW);
Lung-Sheng Tsai, Hsinchu (TW);
Bo-Si Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/129,771

(22) Filed: Sep. 12, 2018

(65) Prior Publication Data

US 2019/0081671 A1 Mar. 14, 2019

Related U.S. Application Data

(60) Provisional application No. 62/570,685, filed on Oct. 11, 2017, provisional application No. 62/557,194, filed on Sep. 12, 2017.

(51) Int. Cl.
*H04B 7/0456* (2017.01)
(52) U.S. Cl.
CPC .................. *H04B 7/0482* (2013.01)
(58) Field of Classification Search
CPC ... H04B 7/0482; H04B 7/0404; H04B 7/0628
See application file for complete search history.

(56) References Cited

U.S. PATENT DOCUMENTS

| 9,351,288 B2* | 5/2016 | Pi ..................... H04W 72/0413 |
| 9,806,781 B2* | 10/2017 | Rahman ............... H04B 7/0469 |
| 2009/0109908 A1* | 4/2009 | Bertrand ............... H04L 5/0051 370/329 |

FOREIGN PATENT DOCUMENTS

| CN | 104782065 A | 7/2015 |
| CN | 106411374 A | 2/2017 |

OTHER PUBLICATIONS

State Intellectual Property Office of China, International Search Report and Written Opinion for International Patent Application No. PCT/CN2018/105285, dated Nov. 28, 2018.

* cited by examiner

*Primary Examiner* — Vineeta S Panwalkar
(74) *Attorney, Agent, or Firm* — Han IP PLLC; Andy M. Han

(57) ABSTRACT

Various solutions with respect to codebook-based uplink transmission in wireless communications are described. A user equipment (UE) receives a first signal from a network node of a wireless network, with the first signal selecting one or more codewords or a codebook from a plurality of different codebooks within a master codebook as allowed precoders at transmission ranks. The UE also receives a second signal from the network node, with the second signal selecting a precoder among the allowed precoders for uplink (UL) transmission. The UE then processes data using the selected precoder and performs an UL transmission of the processed data to the network node.

19 Claims, 6 Drawing Sheets

CODEBOOK-BASED UPLINK TRANSMISSION IN WIRELESS COMMUNICATIONS

CROSS REFERENCE TO RELATED PATENT APPLICATION(S)

The present disclosure is part of a non-provisional application claiming the priority benefit of U.S. Patent Application Nos. 62/557,194 and 62/570,685, filed on 12 Sep. 2017 and 11 Oct. 2017, respectively, the contents of which are incorporated by reference in their entirety.

TECHNICAL FIELD

The present disclosure is generally related to wireless communications and, more particularly, to codebook-based uplink transmission in wireless communications.

BACKGROUND

Unless otherwise indicated herein, approaches described in this section are not prior art to the claims listed below and are not admitted as prior art by inclusion in this section.

In mobile communications in Long-Term Evolution (LTE) and/or $5^{th}$-Generation (5G) and New Radio (NR) mobile networks, due to implementation issues such as relative phase discontinuity (RPD) and phase noise, it may be difficult to maintain phase coherence relative to a reference point in uplink (UL) transmissions from two or more antennas and/or transmitter (Tx) chains from a user equipment (UE). The reference point can be either a point in time in the past (e.g., when a sounding reference signal (SRS) was transmitted by the UE) or a level of power setting (e.g., the power level used by the UE in SRS transmission).

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of solutions, schemes, methods and apparatus pertaining to codebook-based uplink transmission in wireless communications. Under one proposed scheme, UL codebook subset restriction may be utilized by a network for a UE, and control signaling overhead with that UE may depend on the applied UL codebook subset restriction. Moreover, for a UE with a certain coherence transmission capability (e.g., non-coherence capability), the network may be allowed to signal a precoder designed for full coherence or partial coherence. It is believed that the proposed solutions, schemes, methods and apparatus may reduce transmission overhead, improve system performance, and reduce power consumption by UEs.

In one aspect, a method may involve a processor of a user equipment (UE) receiving a first signal from a network node of a wireless network, with the first signal selecting one or more codewords or a codebook from a plurality of different codebooks within a master codebook as allowed precoders at transmission ranks. The method may also involve the processor receiving a second signal from the network node, with the second signal selecting a precoder among the allowed precoders for uplink (UL) transmission. The method may further involve the processor processing data using the selected precoder and performing an UL transmission of the processed data to the network node.

In one aspect, an apparatus may include a transceiver and a processor coupled to the transceiver. The transceiver may be capable of wirelessly communicating with a network node of a wireless network. The processor may be capable of: (a) transmitting, via the transceiver, a reporting on a coherence transmission capability of the UE to the network node; (b) receiving, via the transceiver, a first signal from a network node of a wireless network, with the first signal selecting one or more codewords or a codebook from a plurality of different codebooks within a master codebook as allowed precoders at transmission ranks; (c) receiving, via the transceiver, a second signal from the network node, with the second signal selecting a precoder among the allowed precoders for UL transmission; (d) configuring one or more sounding reference signal (SRS) resources and SRS resource indicator (SRI), transmitted rank indicator (TRI) or transmitted precoding matrix indicator (TPMI) mapping responsive to receiving the first signal and the second signal; and (e) performing, via the transceiver, an UL transmission of the configured one or more SRS resources and the SRI, TRI or TPMI mapping to the network node. The signaling overhead of the second signal may be affected by the allowed precoders signaled in the first signal.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies wherever applicable such as, for example and without limitation, LTE, LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
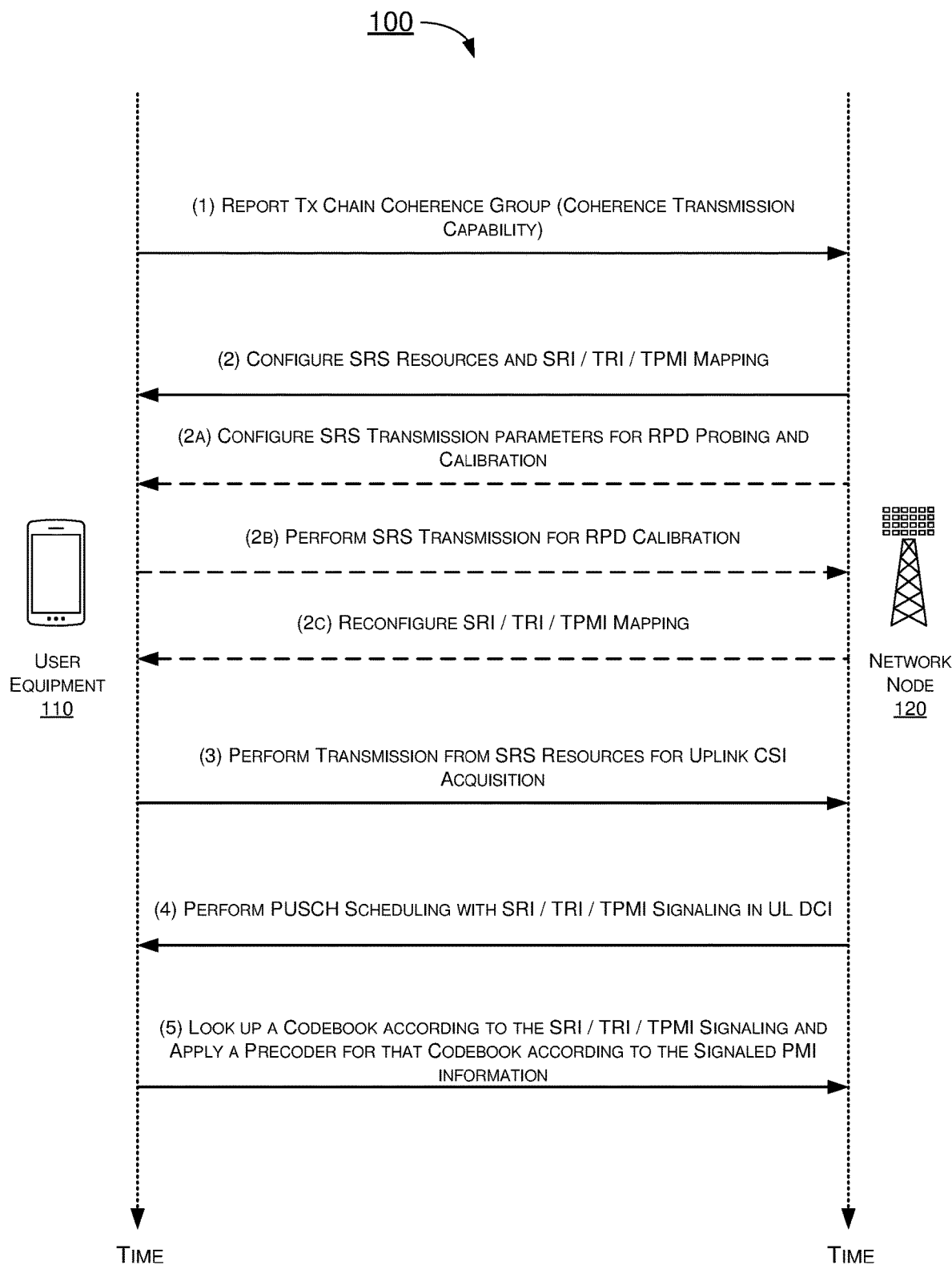
FIG. 1 is a diagram of an example message chain of a procedure for UL codebook-based transmission involving a UE and a network node in accordance with the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to codebook-based uplink transmission in wireless communications. According to the present disclosure, a number of possible solutions may be implemented separately or jointly. That is, although these possible solutions may be described below separately, two or more of these possible solutions may be implemented in one combination or another.

In 5G/NR mobile communications, for RPD, coherent transmissions from multiple antennas may be feasible with power amplifier characterization and/or calibration technologies at either a high-end UE or a base station/network node to which the UE is in wireless communication. For regular UEs, however, RPD may remain a challenge. For phase noise, its effect may be mitigated as new frequency transmit architecture may emerge.

Moreover, even though not all Tx chains are coherent to one another, some of the Tx chains may still maintain coherence with one another. For instance, with four Tx chains at a UE, two Tx chains housed in a millimeter-wave (mmW) panel may suffer from just common-mode phase noise, and the relative phase difference may have no change over time. As for RPD, it may be feasible that two Tx chains are calibrated and/or compensated either at the UE or at the network side. Thus, partial-coherence transmissions among Tx chains may arise in practice.

Accordingly, UL codebook subset restriction may be applied for UL multiple-input-and-multiple-output (MIMO) transmissions. Codebook subset restriction may be either in the form of a bitmap for codewords in the master codebook or in the form of pointers to sub-codebooks within the master codebook. Additionally, DL control overhead may be affected by UL codebook subset restriction.

Uplink Codebook Design

To account for the diverse situations and also forward compatibility, the UL codebook should support different UEs for full-coherence transmissions, non-coherence transmissions, and partial-coherence transmissions. It is also desirable that cyclic-prefix orthogonal frequency-division multiplexing (CP-OFDM) and discrete Fourier transform OFDM (DFT-OFDM) waveforms are supported for UL transmissions with the same codebook.

In view of the above, a master codebook with all the above taken into consideration may contain a large number of codewords at multiple ranks. Usage of the codebook for a specific UE with a specific waveform (e.g., DFT-OFDM) and a specific Tx architecture may be limited to particular codewords that are useful for such UE. Thus, under a proposed scheme in accordance with the present disclosure, codebook subset restriction (CBSR) may be signaled by the base station/network node to the UE, either in the form of a bitmap for codewords in the master codebook or in the form of pointers to sub-codebooks within the master codebook.

As downlink control information (DCI) bits in an UL format typically comes at a premium especially for cell edge UEs, it is desirable to reflect the CBSR in the signaling design. In other words, even though the master codebook may be designed to cover full-coherence transmissions, non-coherence transmissions, partial-coherence transmissions as well as CP-OFDM and DFT-OFDM, a codebook currently in use may be smaller than the full master codebook. For instance, the actual codebook used may depend on the used waveform and Tx-chain capability at the UE (e.g., full-coherence transmissions versus non-coherence transmissions versus partial-coherence transmissions). The transmitted precoding matrix indicator (TPMI) field in the DCI for UL grant may be budgeted according to the sub-codebook resulted from CBSR, from which a more compact DCI may be used compared to the case of using TPMI to address all possible codewords in the master codebook.

Codebook-Based Transmission

Under a proposed scheme in accordance with the present disclosure, a procedure shown in FIG. 1 may be utilized in terms of coherence group configuration and the use of corresponding codebooks. FIG. 1 illustrates an example message chain of a procedure 100 for UL codebook-based transmission involving a UE 30 and a network node 120 in accordance with the present disclosure.

Referring to FIG. 1, at step (1) of procedure 100, UE 30 transmits a Tx-chain coherence group reporting to network node 120. At step (2) of procedure 100, network node 120 transmits signaling to UE 30 to configure one or more SRS resources and SRS resource indicator (SRI), transmitted rank indicator (TRI) and/or precoding matrix indicator (PMI) mapping at UE 30. Specifically, at step (2a), network node 120 may configure SRS transmission parameters for RPD probing and calibration. Additionally, at step (2b), UE 30 may perform SRS transmission to network node 120 for RPD calibration. Moreover, at step (2c), network node 120 may transmit signaling to UE 30 to reconfigure an SRI/TRI/transmitted PMI (TPMI) mapping. At step (3) of procedure 100, UE 30 may perform transmission from SRS resources for UL channel state information (CSI) acquisition. At step (4) of procedure 100, network node 120 may transmit signaling to UE 30 for physical uplink shared channel (PUSCH) scheduling with SRI/TRI/TPMI signaling in an UL DCI. At step (5) of procedure 100, UE 30 may look up a codebook according to the SRI/TRI/TPMI signaling from network node 120, and UE 30 may apply a precoder for the codebook according to the signaled PMI information.

Under a proposed scheme in accordance with the present disclosure, there may be a number of options concerning the coherence group configuration and the usage of codebook(s). In a first option (option 1), the concept of coherence group may be used in the definition of a codebook, but the SRI/TRI/TPMI signaling design may support dynamically indicated selection of a codeword from any codebook.

In a second option (option 2), a network node (e.g., gNB) may signal a coherence group configuration through radio resource control (RRC) signaling or media access control (MAC) control element (CE) to a UE. Moreover, dynamic signaling with an UL DCI may be used to select one or more codewords from a codebook specifically defined for that coherence group configuration.

Figure 2:
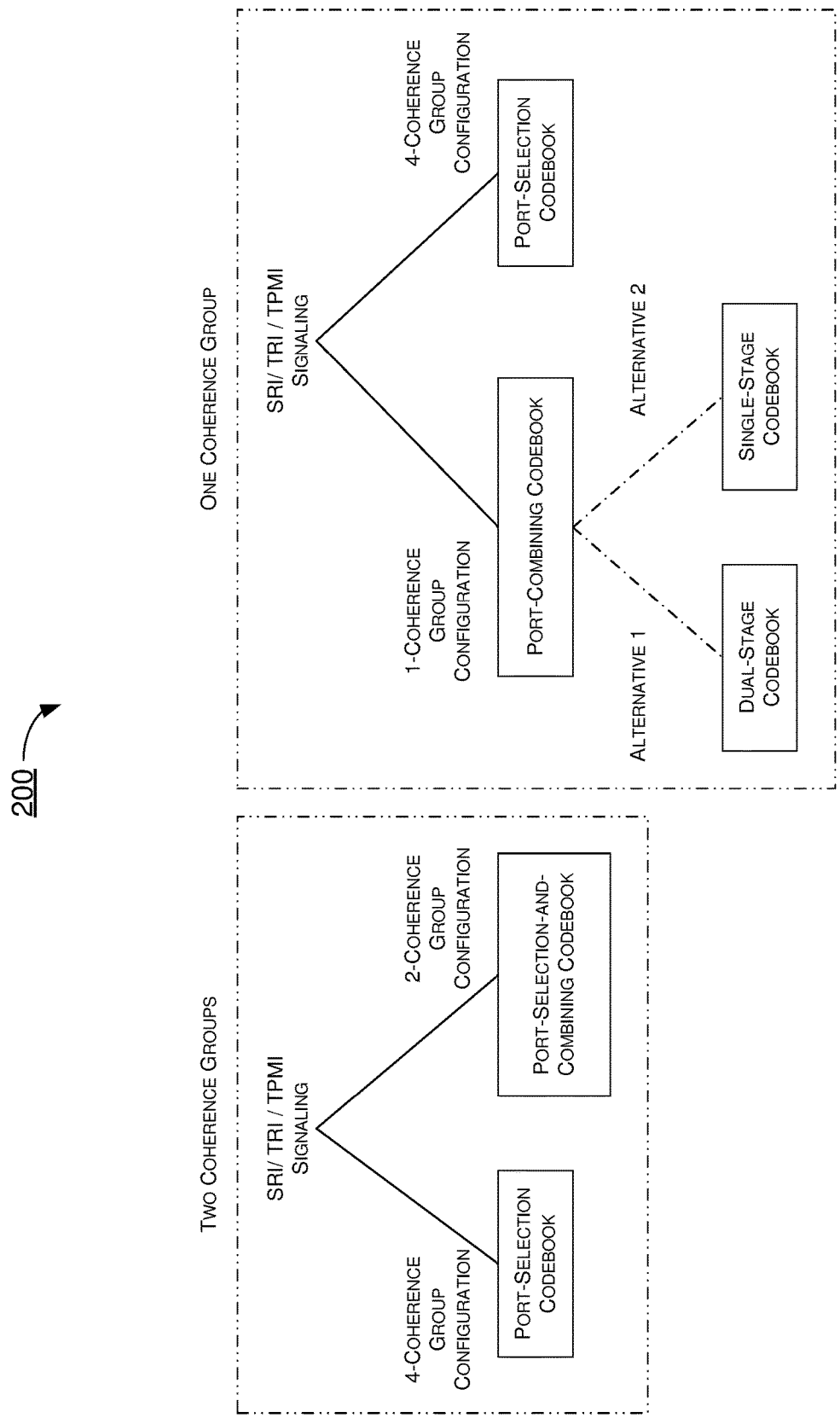
FIG. 2 is a diagram of an example concept in accordance with the present disclosure.

In a third option (option 3), a network node (e.g., gNB) may signal a coherence group configuration through RRC or MAC CE to a UE. As the number of codewords under the codebook with four coherence groups (port-selection codebook) may be limited, and the port-selection codebook may offer useful support for antenna gain imbalance (AGI), the codebook with four coherence groups may be supported with the case of two coherence group configuration and the case of one coherence group, respectively. FIG. 2 illustrates an example concept 200 of option 3 in accordance with the present disclosure. In concept 200, port-selection codebook may be used jointly with port-combining codebook or the recursively constructed codebook with two coherence groups. It is noteworthy that, with option 3 for a UE configured with one coherence group (e.g., from the perspective of the network the UE may be capable of phase coherence transmission from all four Tx chains), the network node may signal a codeword from the port-selection codebook or the port-combining codebook dynamically.

Accordingly, a precoder selection at a base station/network node (e.g., gNB) may not be constrained by the coherence group signaling from a UE (e.g., option 1 and option 3). The concept of coherence group may be used in the definition of a codebook, but the SRI/TRI/TPMI signaling design may support dynamically indicated selection of a codeword from any codebook. This may be important and beneficial in addressing UL transmission power issues.

Illustrative Implementations

Figure 3:
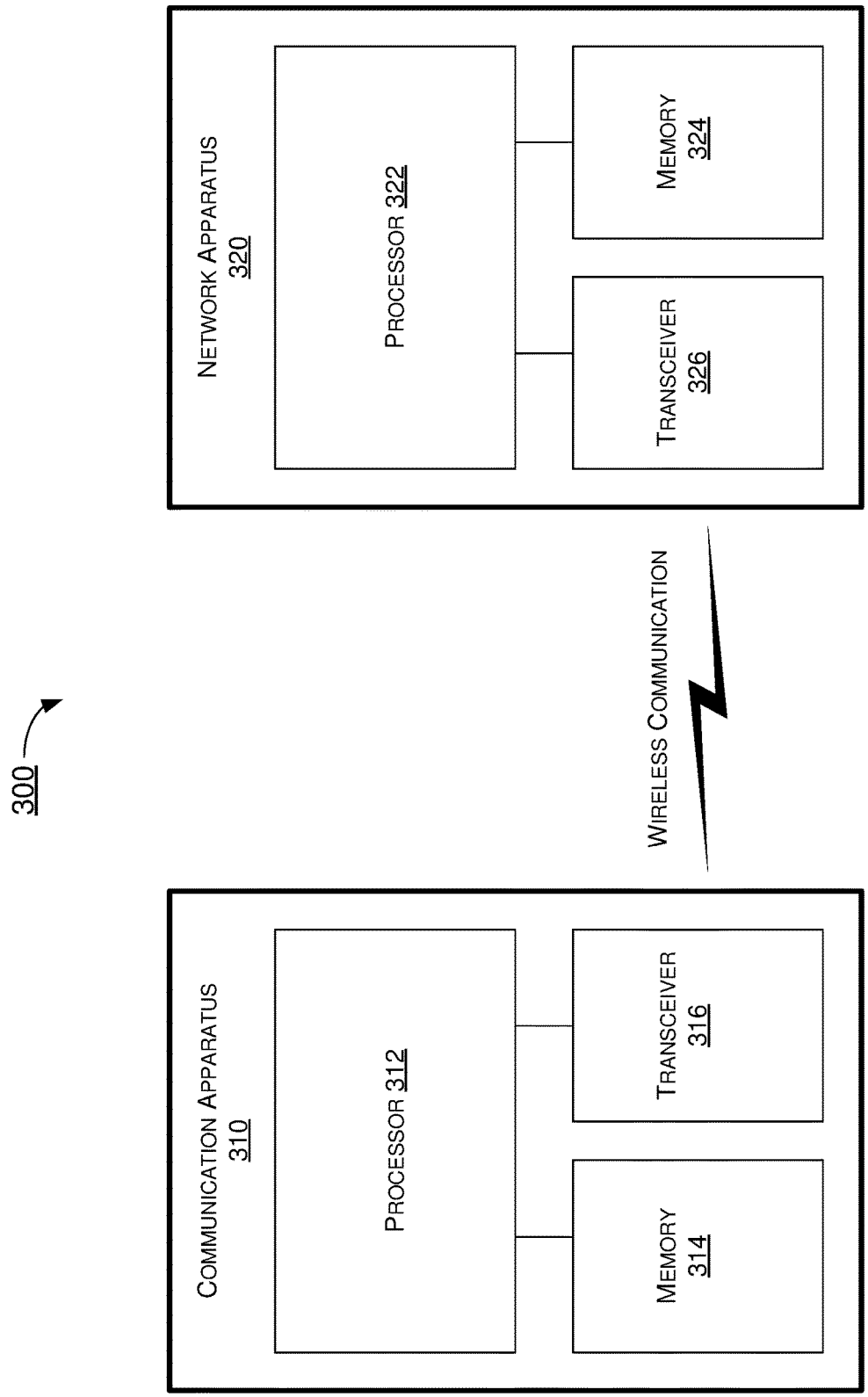
FIG. 3 is a diagram of an example wireless communication environment in accordance with an implementation of the present disclosure.

FIG. 3 illustrates an example wireless communication environment 300 in accordance with an implementation of the present disclosure. Wireless communication environment 300 may involve a communication apparatus 310 and a network apparatus 320 in wireless communication with each other. Each of communication apparatus 310 and network apparatus 320 may perform various functions to implement procedures, schemes, techniques, processes and methods described herein pertaining to codebook-based uplink transmission in wireless communications, including the various procedures, scenarios, schemes, solutions, concepts and techniques described above as well as processes 400, 500 and 600 described below. Thus, communication apparatus 310 may be an example implementation of UE 30 in procedure 100, and network apparatus 320 may be an example implementation of network node 120 in procedure 100.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Moreover, communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a TRP, a base station, a small cell, a router or a gateway. For instance, network apparatus 320 may be implemented in an eNodeB in an LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, one or more RISC processors, or one or more CISC processors.

Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, one or more RISC processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks pertaining to codebook-based uplink transmission in wireless communications in accordance with various implementations of the present disclosure.

In some implementations, communication apparatus 310 may also include a transceiver 316 coupled to processor 312 and capable of wirelessly transmitting and receiving data, signals and information. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data, signals and information. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively.

To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node (e.g., gNB or TRP) of a wireless network (e.g., 5G/NR mobile network).

In one aspect, processor 312 of communication apparatus 310 may receive, via transceiver 316, a first signal from network apparatus 320, with the first signal selecting one or more codewords or a codebook from a plurality of different codebooks within a master codebook as allowed precoders at transmission ranks. Moreover, processor 312 may receive, via transceiver 316, a second signal from network apparatus 320, with the second signal selecting a precoder among the allowed precoders for UL transmission. Additionally, processor 312 may process data using the selected precoder. In some implementations, process 400 may involve processor 312 configuring one or more SRS resources and SRI, TRI and/or TPMI mapping responsive to receiving the first signal and the second signal. Accordingly, in processing the data process 400 may involve processor 312 processing the configured one or more SRS resources and SRI, TRI or TPMI mapping. Furthermore, processor 312 may perform, via transceiver 316, an UL transmission of the processed data to network apparatus 320.

In some implementations, the first signal may indicate a bitmap of the one or more codewords in the master codebook. In some implementations, the selecting may involve selecting according to the bitmap.

In some implementations, the first signal may indicate a pointer to the one or more codewords or the codebook in the master codebook. In some implementations, the selecting may involve selecting according to the pointer.

In some implementations, in performing the UL transmission processor 312 may perform the UL transmission in either or both of CP-OFDM waveforms and DFT-OFDM waveforms using the one or more codewords or the codebook.

In some implementations, signaling overhead of the second signal may be affected (e.g., reduced) by the allowed precoders signaled in the first signal.

In some implementations, in receiving the first signal from network apparatus 320 processor 312 may receive a coherence group configuration through RRC signaling or a MAC CE from network apparatus 320.

In some implementations, processor 312 may also transmit, via transceiver 316, a reporting on a coherence transmission capability of communication apparatus 310 to network apparatus 320. In some implementations, in receiving the first signal and the second signal from network apparatus 320 processor 312 may receive the first signal and the second signal from the network responsive to transmitting the reporting to network apparatus 320.

In some implementations, in receiving the first signal and the second signal from network apparatus 320 processor 312 may dynamically receive signaling from network apparatus 320 that selects a codeword from one of the plurality of different codebooks within the master codebook based on the coherence transmission capability of communication apparatus 310.

In some implementations, the plurality of different codebooks within the master codebook may include the following: (1) a port-selection codebook for a four-coherence group configuration with respect to the coherence transmission capability of communication apparatus 310; (2) a port-selection-and-combining codebook for a two-coherence group configuration with respect to the coherence transmission capability of communication apparatus 310; and (3) at least one port-combining codebook for a one-coherence group configuration with respect to the coherence transmission capability of communication apparatus 310. In some implementations, the at least one port-combining codebook may include a dual-stage codebook and a single-stage codebook.

In some implementations, the second signal from network apparatus 320 may configure a precoder selection used by the processor in selecting the precoder.

In some implementations, the reporting may indicate a non-coherence transmission capability of communication apparatus 310. Moreover, the precoder selection may involve selecting the precoder which corresponds to full-coherence transmission or partial-coherence transmission.

In one aspect, processor 312 of communication apparatus 310 may receive, via transceiver 316, a signal indicating codebook subset restriction (CBSR) from network apparatus 320. Additionally, processor 312 may select one or more codewords or a codebook from a plurality of different codebooks within a master codebook responsive to receiving the signal. Moreover, processor 312 may process data using the selected codebook. Furthermore, processor 312 may perform, via transceiver 316, an UL MIMO transmission of the processed data to network apparatus 320.

In some implementations, the CBSR may indicate a bitmap of the one or more codewords in the master codebook. In such cases, in selecting, processor 312 may select according to the bitmap.

In some implementations, the CBSR may indicate a pointer to the one or more codewords or the codebook in the master codebook. In such cases, in selecting, processor 312 may select according to the pointer.

In some implementations, in performing the UL MIMO transmission, processor 312 may perform the UL MIMO transmission in either or both of CP-OFDM waveforms and DFT-OFDM waveforms using the one or more codewords or the codebook.

In some implementations, in selecting the one or more codewords or the codebook, processor 312 may select the one or more codewords or the codebook based on the CBSR signal such that DL control overhead at network apparatus 320 is reduced.

In some implementations, in receiving the signal from network apparatus 320, processor 312 may receive a coherence group configuration through RRC signaling or a MAC CE from network apparatus 320.

In some implementations, processor 312 may transmit, via transceiver 316, a reporting on a coherence transmission capability of communication apparatus 310 to network apparatus 320. Moreover, the receiving of the signal from network apparatus 320 involves receiving the signal from the network responsive to transmitting the reporting to network apparatus 320.

In some implementations, in receiving the signal from network apparatus 320, processor 312 may dynamically receive signaling from network apparatus 320 that selects a codeword from one of the plurality of different codebooks within the master codebook based on the coherence transmission capability of communication apparatus 310.

In some implementations, the plurality of different codebooks within the master codebook may include: (a) a port-selection codebook for a four-coherence group configuration with respect to the coherence transmission capability of communication apparatus 310; (b) a port-selection-and-combining codebook for a two-coherence group configuration with respect to the coherence transmission capability of communication apparatus 310; and (c) at least one port-combining codebook for a one-coherence group configuration with respect to the coherence transmission capability of communication apparatus 310. In some implementations, the at least one port-combining codebook may include a dual-stage codebook and a single-stage codebook.

In some implementations, the signal from network apparatus 320 may configure a precoder selection used by processor 312 in selecting the one or more codewords or the codebook from the plurality of different codebooks within the master codebook. In some implementations, the reporting may indicate a non-coherence transmission capability of communication apparatus 310. In some implementations, the precoder selection may select a precoder designed for full-coherence transmission or partial-coherence transmission.

In some implementations, processor 312 may configure one or more SRS resources and an SRI, TRI and/or TPMI mapping responsive to receiving the signal.

In one aspect, processor 322 of network apparatus 310 may determine a CBSR. Additionally, processor 322 may transmit, via transceiver 326, a signal indicating the CBSR to communication apparatus 310. Moreover, processor 322 may receive, via transceiver 326, an UL MIMO transmission from communication apparatus 310 such that communication apparatus 310 performs the UL MIMO transmission using one or more codewords or a codebook selected from a plurality of different codebooks within a master codebook based on the CBSR.

In some implementations, the CBSR may indicate a bitmap of the one or more codewords in the master codebook such that communication apparatus 310 selects the one or more codewords according to the bitmap.

In some implementations, the CBSR may indicate a pointer to the one or more codewords or the codebook in the master codebook such that communication apparatus 310 selects the one or more codewords or the codebook according to the pointer.

In some implementations, in receiving the UL MIMO transmission from communication apparatus 310, processor 322 may receive the UL MIMO transmission in either or both of CP-OFDM waveforms and DFT-OFDM waveforms from communication apparatus 310 using the one or more codewords or the codebook.

In some implementations, in determining the CBSR, processor 322 may determine the one or more codewords or the codebook to be used by communication apparatus 310 such that DL control overhead at network apparatus 320 is reduced.

Illustrative Processes

Figure 4:
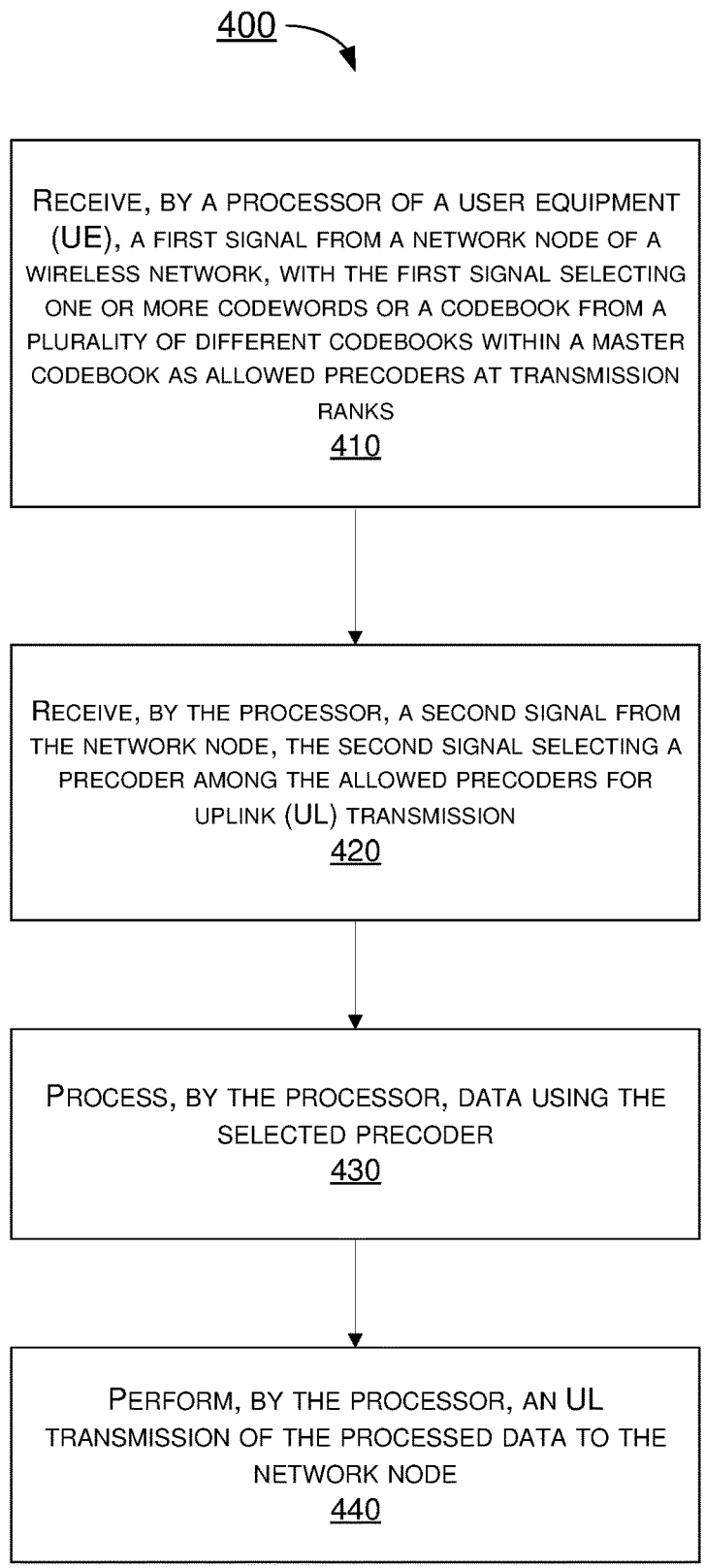
FIG. 4 is a flowchart of an example process in accordance with an implementation of the present disclosure.

FIG. 4 illustrates an example process 400 in accordance with an implementation of the present disclosure. Process 400 may be an example implementation of the various procedures, scenarios, schemes, solutions, concepts and techniques, or a combination thereof, whether partially or completely, with respect to codebook-based uplink transmission in wireless communications in accordance with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order, and one or more of the blocks of process 400 may be repeated one or more times. Process 400 may be implemented by communication apparatus 310 or any suitable UE or machine type devices. Solely for illustrative purposes and without limitation, process 400 is described below in the context of communication apparatus 310 as a UE and network apparatus 320 as a network node (e.g., gNB) of a wireless network. Process 400 may begin at block 410.

At 410, process 400 may involve processor 312 of communication apparatus 310 receiving, via transceiver 316, a first signal from network apparatus 320, with the first signal selecting one or more codewords or a codebook from a plurality of different codebooks within a master codebook as allowed precoders at transmission ranks. Process 400 may proceed from 410 to 420.

At 420, process 400 may involve processor 312 receiving, via transceiver 316, a second signal from network apparatus 320, with the second signal selecting a precoder among the allowed precoders for UL transmission. Process 400 may proceed from 420 to 430.

At 430, process 400 may involve processor 312 processing data using the selected precoder. In some implementations, process 400 may involve processor 312 configuring one or more SRS resources and an SRI, TRI or TPMI mapping responsive to receiving the first signal and the second signal. Accordingly, in processing the data process 400 may involve processor 312 processing the configured one or more SRS resources and the SRI, TRI or TPMI mapping. Process 400 may proceed from 430 to 440.

At 440, process 400 may involve processor 312 performing, via transceiver 316, an UL transmission of the processed data to network apparatus 320.

In some implementations, the first signal may indicate a bitmap of the one or more codewords in the master codebook. In some implementations, the selecting may involve selecting according to the bitmap.

In some implementations, the first signal may indicate a pointer to the one or more codewords or the codebook in the master codebook. In some implementations, the selecting may involve selecting according to the pointer.

In some implementations, in performing the UL transmission process 400 may involve processor 312 performing the UL transmission in either or both of CP-OFDM waveforms and DFT-OFDM waveforms using the one or more codewords or the codebook.

In some implementations, signaling overhead of the second signal may be affected (e.g., reduced) by the allowed precoders signaled in the first signal.

In some implementations, in receiving the first signal from network apparatus 320 process 400 may involve processor 312 receiving a coherence group configuration through RRC signaling or a MAC CE from network apparatus 320.

In some implementations, process 400 may further involve processor 312 transmitting, via transceiver 316, a reporting on a coherence transmission capability of communication apparatus 310 to network apparatus 320. In some implementations, in receiving the first signal and the second signal from network apparatus 320 process 400 may involve processor 312 receiving the first signal and the second signal from the network responsive to transmitting the reporting to network apparatus 320.

In some implementations, in receiving the first signal and the second signal from network apparatus 320 process 400 may involve processor 312 dynamically receiving signaling from network apparatus 320 that selects a codeword from one of the plurality of different codebooks within the master codebook based on the coherence transmission capability of communication apparatus 310.

In some implementations, the plurality of different codebooks within the master codebook may include the following: (1) a port-selection codebook for a four-coherence group configuration with respect to the coherence transmission capability of communication apparatus 310; (2) a port-selection-and-combining codebook for a two-coherence group configuration with respect to the coherence transmission capability of communication apparatus 310; and (3) at least one port-combining codebook for a one-coherence group configuration with respect to the coherence transmission capability of communication apparatus 310. In some implementations, the at least one port-combining codebook may include a dual-stage codebook and a single-stage codebook.

In some implementations, the second signal from network apparatus 320 may configure a precoder selection used by the processor in selecting the precoder.

In some implementations, the reporting may indicate a non-coherence transmission capability of communication apparatus 310. Moreover, the precoder selection may involve selecting the precoder which corresponds to full-coherence transmission or partial-coherence transmission.

Figure 5:
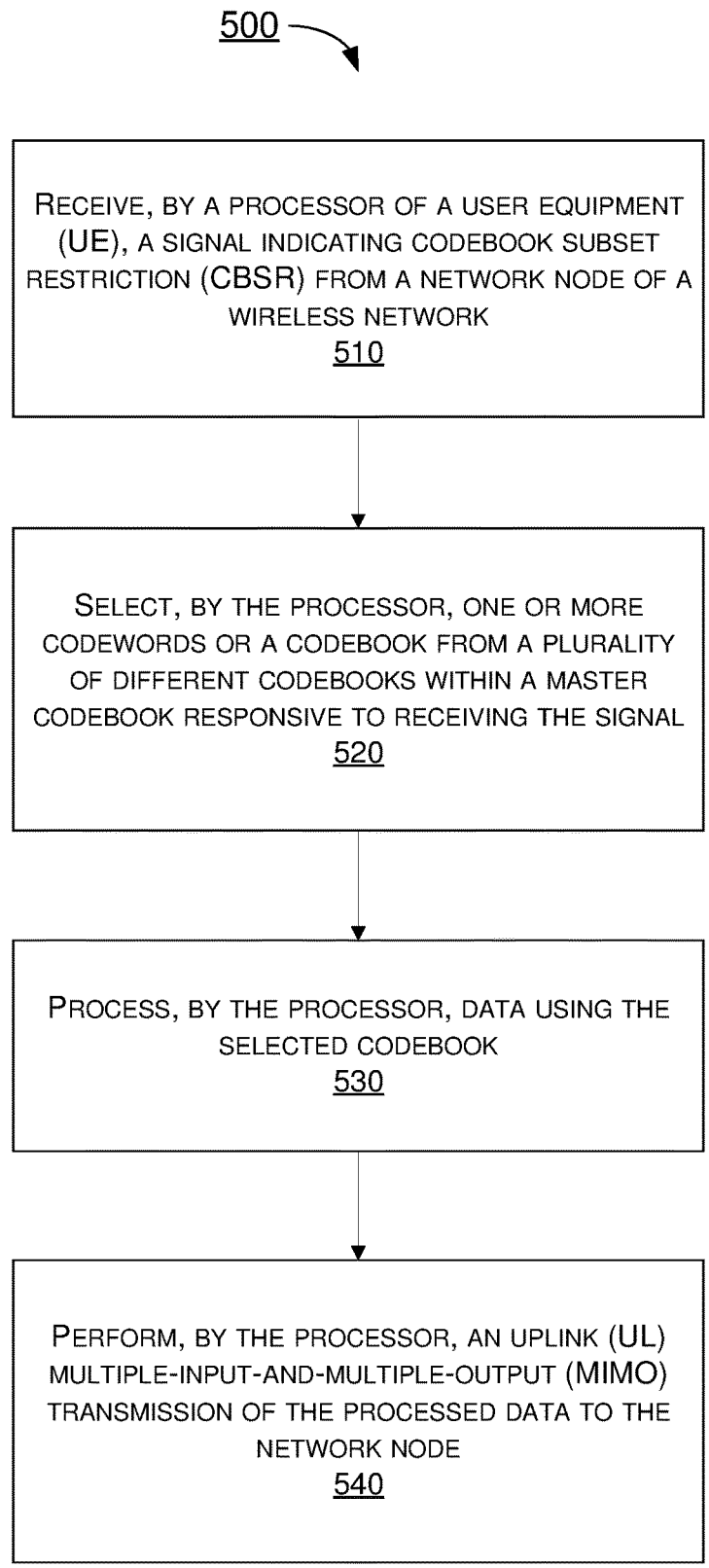
FIG. 5 is a flowchart of an example process in accordance with an implementation of the present disclosure.

FIG. 5 illustrates an example process 500 in accordance with an implementation of the present disclosure. Process 500 may be an example implementation of the various procedures, scenarios, schemes, solutions, concepts and techniques, or a combination thereof, whether partially or completely, with respect to codebook-based uplink transmission in wireless communications in accordance with the present disclosure. Process 500 may represent an aspect of implementation of features of communication apparatus 310. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order, and one or more of the blocks of process 500 may be repeated one or more times. Process 500 may be implemented by communication apparatus 310 or any suitable UE or machine type devices. Solely for illustrative purposes and without limitation, process 500 is described below in the context of communication apparatus 310 as a UE and network apparatus 320 as a network node (e.g., gNB) of a wireless network. Process 500 may begin at block 510.

At 510, process 500 may involve processor 312 of communication apparatus 310 receiving, via transceiver 316, a signal indicating codebook subset restriction (CBSR) from network apparatus 320. Process 500 may proceed from 510 to 520.

At 520, process 500 may involve processor 312 selecting one or more codewords or a codebook from a plurality of different codebooks within a master codebook responsive to receiving the signal. Process 500 may proceed from 520 to 530.

At 530, process 500 may involve processor 312 processing data using the selected codebook. Process 500 may proceed from 530 to 540.

At 540, process 500 may involve processor 312 performing, via transceiver 316, an UL MIMO transmission of the processed data to network apparatus 320.

In some implementations, the CBSR may indicate a bitmap of the one or more codewords in the master codebook. In such cases, in selecting, process 500 may involve processor 312 selecting according to the bitmap.

In some implementations, the CBSR may indicate a pointer to the one or more codewords or the codebook in the master codebook. In such cases, in selecting, process 500 may involve processor 312 selecting according to the pointer.

In some implementations, in performing the UL MIMO transmission, process 500 may involve processor 312 performing the UL MIMO transmission in either or both of CP-OFDM waveforms and DFT-OFDM waveforms using the one or more codewords or the codebook.

In some implementations, in selecting the one or more codewords or the codebook, process 500 may involve processor 312 selecting the one or more codewords or the codebook based on the CBSR signal such that DL control overhead at network apparatus 320 is reduced.

In some implementations, in receiving the signal from network apparatus 320, process 500 may involve processor 312 receiving a coherence group configuration through RRC signaling or a MAC CE from network apparatus 320.

In some implementations, process 500 may further involve processor 312 transmitting, via transceiver 316, a reporting on a coherence transmission capability of communication apparatus 310 to network apparatus 320. Moreover, the receiving of the signal from network apparatus 320 involves receiving the signal from the network responsive to transmitting the reporting to network apparatus 320.

In some implementations, in receiving the signal from network apparatus 320, process 500 may involve processor 312 dynamically receiving signaling from network apparatus 320 that selects a codeword from one of the plurality of different codebooks within the master codebook based on the coherence transmission capability of communication apparatus 310.

In some implementations, the plurality of different codebooks within the master codebook may include: (a) a port-selection codebook for a four-coherence group configuration with respect to the coherence transmission capability of communication apparatus 310; (b) a port-selection-and-combining codebook for a two-coherence group configuration with respect to the coherence transmission capability of communication apparatus 310; and (c) at least one port-combining codebook for a one-coherence group configuration with respect to the coherence transmission capability of communication apparatus 310. In some implementations, the at least one port-combining codebook may include a dual-stage codebook and a single-stage codebook.

In some implementations, the signal from network apparatus 320 may configure a precoder selection used by processor 312 in selecting the one or more codewords or the codebook from the plurality of different codebooks within the master codebook. In some implementations, the reporting may indicate a non-coherence transmission capability of communication apparatus 310. In some implementations, the precoder selection may select a precoder designed for full-coherence transmission or partial-coherence transmission.

In some implementations, process 500 may further involve processor 312 configuring one or more SRS resources and an SRI, TRI and/or TPMI mapping responsive to receiving the signal.

Figure 6:
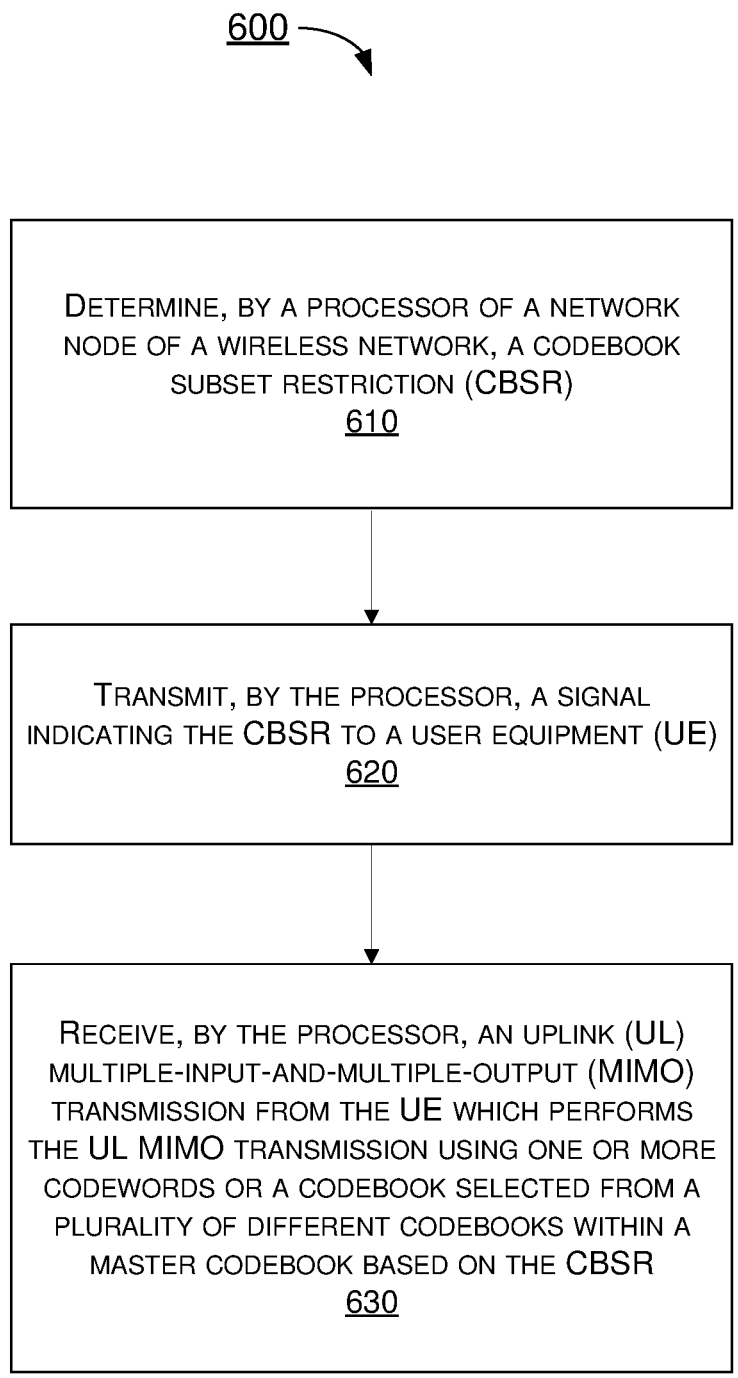
FIG. 6 is a flowchart of an example process in accordance with an implementation of the present disclosure.

FIG. 6 illustrates an example process 600 in accordance with an implementation of the present disclosure. Process 600 may be an example implementation of the various procedures, scenarios, schemes, solutions, concepts and techniques, or a combination thereof, whether partially or completely, with respect to codebook-based uplink transmission in wireless communications in accordance with the present disclosure. Process 600 may represent an aspect of implementation of features of communication apparatus 310. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks of process 600 may be executed in the order shown in FIG. 6 or, alternatively, in a different order, and one or more of the blocks of process 600 may be repeated one or more times. Process 600 may be implemented by communication apparatus 310 or any suitable UE or machine type devices. Solely for illustrative purposes and without limitation, process 600 is described below in the context of communication apparatus 310 as a UE and network apparatus 320 as a network node of a wireless network. Process 600 may begin at block 610.

At 610, process 600 may involve processor 322 of network apparatus 310 determining a CBSR. Process 600 may proceed from 610 to 620.

At 620, process 600 may involve processor 322 transmitting, via transceiver 326, a signal indicating the CBSR to communication apparatus 310. Process 600 may proceed from 620 to 630.

At 630, process 600 may involve processor 322 receiving, via transceiver 326, an UL MIMO transmission from communication apparatus 310 such that communication apparatus 310 performs the UL MIMO transmission using one or more codewords or a codebook selected from a plurality of different codebooks within a master codebook based on the CBSR.

In some implementations, the CBSR may indicate a bitmap of the one or more codewords in the master codebook such that communication apparatus 310 selects the one or more codewords according to the bitmap.

In some implementations, the CBSR may indicate a pointer to the one or more codewords or the codebook in the master codebook such that communication apparatus 310 selects the one or more codewords or the codebook according to the pointer.

In some implementations, in receiving the UL MIMO transmission from communication apparatus 310, process 600 may involve processor 322 receiving the UL MIMO transmission in either or both of CP-OFDM waveforms and DFT-OFDM waveforms from communication apparatus 310 using the one or more codewords or the codebook.

In some implementations, in determining the CBSR, process 600 may involve processor 322 determining the one or more codewords or the codebook to be used by communication apparatus 310 such that DL control overhead at network apparatus 320 is reduced.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of a user equipment (UE), a first signal from a network node of a wireless network, the first signal selecting one or more codewords or a codebook from a plurality of different codebooks within a master codebook as allowed precoders at transmission ranks;
    receiving, by the processor, a second signal from the network node, the second signal selecting a precoder among the allowed precoders for uplink (UL) transmission;
    processing, by the processor, data using the selected precoder; and
    performing, by the processor, an UL transmission of the processed data to the network node,
    wherein the receiving of the first signal from the network node comprises receiving a coherence group configuration through radio resource control (RRC) signaling or a media access control (MAC) control element (CE) from the network node.

2. The method of claim 1, wherein the first signal indicates a bitmap of the one or more codewords in the master codebook, and wherein the selecting comprises selecting according to the bitmap.

3. The method of claim 1, wherein the first signal indicates a pointer to the one or more codewords or the codebook in the master codebook, and wherein the selecting comprises selecting according to the pointer.

4. The method of claim 1, wherein the performing of the UL transmission comprises performing the UL transmission in either or both of cyclic-prefix orthogonal frequency-division multiplexing (CP-OFDM) waveforms and discrete Fourier transform OFDM (DFT-OFDM) waveforms using the one or more codewords or the codebook.

5. The method of claim 1, wherein signaling overhead of the second signal is affected by the allowed precoders signaled in the first signal.

6. The method of claim 1, further comprising:
    transmitting, by the processor, a reporting on a coherence transmission capability of the UE to the network node, wherein the receiving of the first signal and the second signal from the network node comprises receiving the first signal and the second signal from the network node responsive to transmitting the reporting to the network node.

7. The method of claim 6, wherein the receiving of the first signal and the second signal from the network node comprises dynamically receiving signaling from the network node that selects a codeword from one of the plurality of different codebooks within the master codebook based on the coherence transmission capability of the UE.

8. The method of claim 7, wherein the plurality of different codebooks within the master codebook comprise:
    a port-selection codebook for a four-coherence group configuration with respect to the coherence transmission capability of the UE;
    a port-selection-and-combining codebook for a two-coherence group configuration with respect to the coherence transmission capability of the UE; and
    at least one port-combining codebook for a one-coherence group configuration with respect to the coherence transmission capability of the UE,
    wherein the at least one port-combining codebook comprises a dual-stage codebook and a single-stage codebook.

9. The method of claim 6, wherein the second signal from the network node configures a precoder selection used by the processor in selecting the precoder.

10. The method of claim 9, wherein the reporting indicates a non-coherence transmission capability of the UE, and wherein the precoder selection selects the precoder which corresponds to full-coherence transmission or partial-coherence transmission.

11. The method of claim 1, further comprising:
    configuring, by the processor, one or more sounding reference signal (SRS) resources and an SRS resource indicator (SRI), transmitted rank indicator (TRI) or transmitted precoding matrix indicator (TPMI) mapping.

12. An apparatus, comprising:
    a transceiver capable of wirelessly communicating with a network node of a wireless network; and
    a processor coupled to the transceiver, the processor capable of:
        transmitting, via the transceiver, a reporting on a coherence transmission capability of the UE to the network node;
        receiving, via the transceiver, a first signal from a network node of a wireless network, the first signal selecting one or more codewords or a codebook from a plurality of different codebooks within a master codebook as allowed precoders at transmission ranks;
        receiving, via the transceiver, a second signal from the network node, the second signal selecting a precoder among the allowed precoders for uplink (UL) transmission;
        configuring one or more sounding reference signal (SRS) resources and an SRS resource indicator (SRI), transmitted rank indicator (TRI) or transmitted precoding matrix indicator (TPMI) mapping responsive to receiving the first signal and the second signal; and
        performing, via the transceiver, an UL transmission of the configured one or more SRS resources and the SRI, TRI or TPMI mapping to the network node,
    wherein signaling overhead of the second signal is affected by the allowed precoders signaled in the first signal.

13. The apparatus of claim 12, wherein the first signal indicates a bitmap of the one or more codewords in the master codebook, and wherein in selecting the processor is capable of selecting according to the bitmap.

14. The apparatus of claim 12, wherein the first signal indicates a pointer to the one or more codewords or the codebook in the master codebook, and wherein in selecting the processor is capable of selecting according to the pointer.

15. The apparatus of claim 12, wherein in performing the UL transmission the processor is capable of performing the UL transmission in either or both of cyclic-prefix orthogonal frequency-division multiplexing (CP-OFDM) waveforms and discrete Fourier transform OFDM (DFT-OFDM) waveforms using the one or more codewords or the codebook.

16. The apparatus of claim 12, wherein in receiving the first signal from the network node the processor is capable of receiving a coherence group configuration through radio resource control (RRC) signaling or a media access control (MAC) control element (CE) from the network node.

17. The apparatus of claim 12, wherein in receiving the first signal and the second signal from the network node the processor is capable of dynamically receiving signaling from the network node that selects a codeword from one of the plurality of different codebooks within the master codebook based on the coherence transmission capability of the UE.

18. The apparatus of claim 17, wherein the plurality of different codebooks within the master codebook comprise:
    a port-selection codebook for a four-coherence group configuration with respect to the coherence transmission capability of the UE;
    a port-selection-and-combining codebook for a two-coherence group configuration with respect to the coherence transmission capability of the UE; and
    at least one port-combining codebook for a one-coherence group configuration with respect to the coherence transmission capability of the UE,
    wherein the at least one port-combining codebook comprises a dual-stage codebook and a single-stage codebook.

19. The apparatus of claim 12, wherein the second signal from the network node configures a precoder selection used by the processor, wherein the reporting indicates a non-coherence transmission capability of the UE, and wherein the precoder selection selects the precoder which corresponds to full-coherence transmission or partial-coherence transmission.

* * * * *